United States Patent
Yang et al.

(10) Patent No.: US 9,203,455 B2
(45) Date of Patent: Dec. 1, 2015

(54) FULL DUPLEX SYSTEM WITH SELF-INTERFERENCE CANCELLATION

(75) Inventors: Tulong Yang, Houston, TX (US); Charles Chen, Houston, TX (US); Aydin Babakhani, Houston, TX (US)

(73) Assignee: BROADCOM CORPORATION, Irvine, CA (US)

(*) Notice: Subject to any disclaimer, the term of this patent is extended or adjusted under 35 U.S.C. 154(b) by 187 days.

(21) Appl. No.: 13/585,043

(22) Filed: Aug. 14, 2012

(65) Prior Publication Data

US 2014/0050124 A1    Feb. 20, 2014

(51) Int. Cl.
*H04B 7/005* (2006.01)
*H04B 1/18* (2006.01)
(Continued)

(52) U.S. Cl.
CPC .. *H04B 1/18* (2013.01); *H04B 1/10* (2013.01); *H04B 1/525* (2013.01); *H04B 1/71072* (2013.01)

(58) Field of Classification Search
CPC ..... H04L 12/10; H04L 12/2697; H04L 1/242; H04L 5/14; H04L 12/2801; H04B 1/18; H04B 1/525; H04B 1/1036; H04B 1/71; H04B 1/10; H04B 1/7107; H04B 1/71072; H04B 1/123; H04B 15/02; H04W 24/08; H04W 24/00; H04W 72/085
USPC ......... 370/329, 317, 277, 278, 280, 335, 342; 375/219, 276, 346, 144, 148, E1.031; 455/78, 3.06, 550.1, 307, 313, 553.1, 455/103, 296, 63.1, 77
See application file for complete search history.

(56) References Cited

U.S. PATENT DOCUMENTS 6,539,204 B1 * 3/2003 Marsh et al. ................. 455/63.1
7,155,179 B1   12/2006 Rothenberg
(Continued)

FOREIGN PATENT DOCUMENTS

EP    1 675 270 A2    6/2006
WO   WO 2004/098085 A1    11/2004
(Continued)

OTHER PUBLICATIONS

International Search Report and Written Opinion—PCT/IB2013/001361 dated Oct. 15, 2013.
(Continued)

*Primary Examiner* — Kwang B Yao
*Assistant Examiner* — Harun Chowdhury
(74) *Attorney, Agent, or Firm* — Foley & Lardner LLP; Christopher J. McKenna; Paul M. H. Pua

(57) ABSTRACT

An apparatus and method enable a full duplex system with self-interference cancellation. Receiving circuitry forming a signal receiving path is arranged for transferring communication signals received via air interface. Transmitting circuitry forming a signal transmission path is arranged for transferring communication signals to be transmitted via air interface. Interference cancellation circuitry is in operable connection between the signal receiving path and the signal transmission path. The receiving circuitry and the transmitting circuitry are arranged to receive and transmit communication signals at the same time and at the same frequency. The interference cancellation circuitry comprises resistance, inductance and capacitance arranged to constitute a center frequency of an isolation range between the signal receiving path and the signal transmission path which substantially falls into the center of a communication band for the signals received and/or to be transmitted via air interface.

20 Claims, 9 Drawing Sheets

(51) Int. Cl.
*H04B 1/10* (2006.01)
*H04B 1/7107* (2011.01)
*H04B 1/525* (2015.01)

(56) References Cited

U.S. PATENT DOCUMENTS

| | | |
|---|---|---|
| 8,036,623 B2 | 10/2011 | Chang et al. |
| 8,135,348 B2 | 3/2012 | Aparin |
| 2006/0030277 A1* | 2/2006 | Cyr et al. .................. 455/77 |
| 2007/0105509 A1 | 5/2007 | Muhammad et al. |
| 2008/0219331 A1* | 9/2008 | Liang et al. ............... 375/219 |
| 2008/0227409 A1* | 9/2008 | Chang et al. .............. 455/78 |
| 2010/0022201 A1* | 1/2010 | Vandenameele ........... 455/78 |
| 2010/0035563 A1 | 2/2010 | Mikhemar et al. |
| 2010/0232324 A1* | 9/2010 | Radunovic et al. ........ 370/277 |
| 2011/0064004 A1 | 3/2011 | Mikhemar et al. |
| 2011/0064005 A1* | 3/2011 | Mikhemar et al. ......... 370/278 |
| 2011/0299431 A1 | 12/2011 | Mikhemar et al. |
| 2012/0063368 A1* | 3/2012 | Boyle ........................ 370/277 |
| 2013/0259102 A1* | 10/2013 | Gudem et al. ............. 375/219 |

FOREIGN PATENT DOCUMENTS

| | | |
|---|---|---|
| WO | WO 2007/149954 A1 | 12/2007 |
| WO | WO 2011/053887 A1 | 5/2011 |
| WO | WO 2012/106263 A1 | 8/2012 |

OTHER PUBLICATIONS

M. Mikhemar, et al., "A Tunable Integrated Duplexer with 50db Isolation in 40nm CMOS," ISSCC 2009/Session 22/PA and Antenna Interface/22.7, 2009 IEEE International Solid-State Circuits Conference (3 pages).

Mohyee Mikhemar, et al., "An On-Chip Wideband and Low-Loss Duplexer for 3G/4G CMOS Radios," IEEE, 2010 Symposium on VLSI Circuits/Technical Digest of Technical Papers, p. 129-130 (2 pages).

Mayank Jain et al., "Practical, Real-time, Full Duplex Wireless," MobiCom'11, Sep. 19-23, 2011, Las Vegas, Nevada, U.S.A. (12 pages).

* cited by examiner

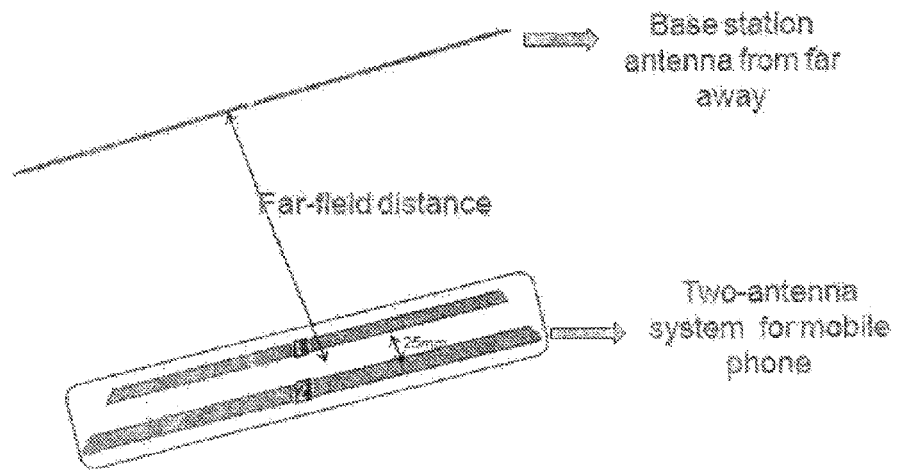
Fig. 5
FIG. 6
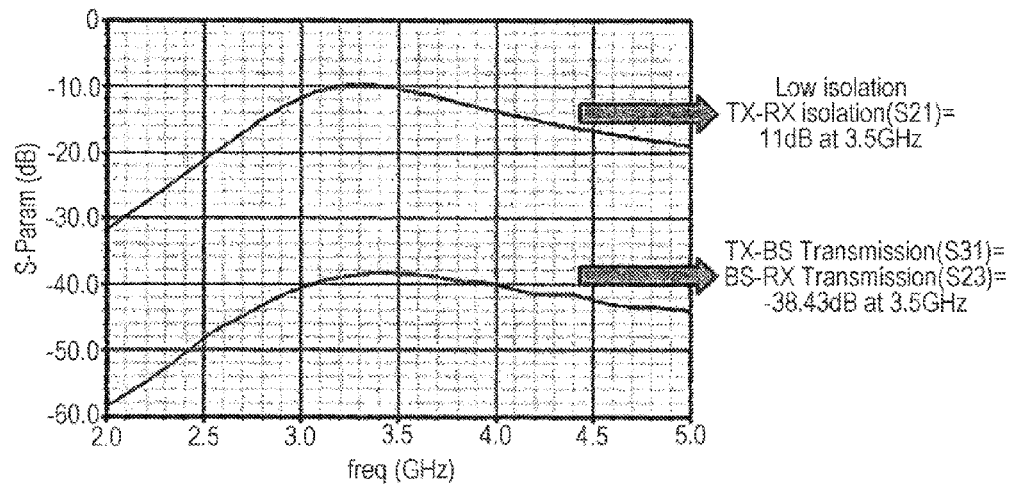

FULL DUPLEX SYSTEM WITH SELF-INTERFERENCE CANCELLATION

TECHNICAL FIELD

The present invention relates to an apparatus and method enabling a full duplex system with self-interference cancellation.

BACKGROUND

Prior art which is related to this technical field can e.g. be found in specifications describing radio frequency duplexer.

The following meanings for the abbreviations used in this specification apply:
3GPP $3^{rd}$ Generation Partnership Project
BS Base Station
DC Direct Current
FDD Frequency Division Duplex
HSDPA High Speed Downlink Packet Access
LNA Low Noise Amplifier
LTE Long Term Evolution
PA Power Amplifier
Rx Receiver
RF Radio Frequency
TDD Time Division Duplex
Tx Transmitter
WCDMA Wideband Code Division Multiple Access In present wireless communication systems, frequency-division, time-division, and/or code-division are used to divide the transmitted signal from the received signal. The increasing demand for high speed and spectral efficiency communication impels the development of full-duplex techniques for such communication systems. The common techniques employed are TDD and FDD, which separate the transmission channel and receiving channel in different time slots and in different frequency bands, respectively.

A more challenging technique relies on enabling transmitting and receiving signals at the same time and at the same frequency, with low self-interference from the transmitted signal to the received signal, resulting in full-duplex transceiver for both the base station antenna and the mobile phone antenna.

The main problem of the full-duplex system is the presence of the self-interference caused by the transmitted signal, which can be as large as 25 dBm (316 mW), to the received signal, which can be as small as −90 dbm (1 pW). Thus, the interference can easily saturate the receiver.

SUMMARY OF THE INVENTION

It is an object of the present invention to provide an apparatus and method for enabling a full duplex system with self-interference cancellation.

According to a first aspect of the present invention, according to certain embodiments thereof, this is accomplished by an apparatus, comprising receiving circuitry forming a signal receiving path arranged for transferring communication signals received via air interface; transmitting circuitry forming a signal transmission path arranged for transferring communication signals to be transmitted via air interface; and interference cancellation circuitry in operable connection between the signal receiving path and the signal transmission path, wherein the receiving circuitry and the transmitting circuitry are arranged to receive and transmit communication signals at the same time and at the same frequency, wherein the interference cancellation circuitry comprises resistance, inductance and capacitance arranged to constitute a center frequency of an isolation range between the signal receiving path and the signal transmission path which substantially falls into the center of a communication band for the signals received and/or to be transmitted via air interface.

According to a second aspect of the present invention, according to certain embodiments thereof, this is accomplished by a method, comprising receiving communication signals via air interface and transferring the same in a signal receiving path; transmitting communication signals via air interface and transferring the same in a signal transmission path, wherein the communication signals are received and transmitted at the same time and at the same frequency; and cancelling interference between the signal receiving path and the signal transmission path by an interference cancellation circuit connected there between, which comprises resistance, inductance and capacitance arranged to constitute a center frequency of an isolation range between the signal receiving path and the signal transmission path which substantially falls into the center of a communication band for the signals received and/or transmitted via air interface.

Thus, it is possible to enable construction of a full-duplex system which achieves high isolation as well as wide bandwidth.

BRIEF DESCRIPTION OF THE DRAWINGS

The above and other objects, features, details and advantages will become more fully apparent from the following detailed description of the preferred embodiments which is to be taken in conjunction with the appended drawings, in which:

FIG. 5 shows a power coupling simulation model for illustrating a two-antenna system with respect to a base station according to certain embodiments of the present invention;

FIG. 6 shows a graph illustrating a simulation result for an antenna model without interference cancellation circuitry;

DETAILED DESCRIPTION OF THE PREFERRED EMBODIMENTS

In the following, description is made to what are presently considered to be preferred embodiments of the present invention. It is to be understood, however, that the description is given by way of example only, and that the described embodiments are by no means to be understood as limiting the present invention thereto.

For example, for illustration purposes, in some of the following exemplary embodiments, enabling full duplex with self-interference cancellation in simultaneous receiving and transmission of signals of a same frequency in wireless communication in cellular communication networks as e.g. based on LTE, LTE-Advanced or WCDMA is described. However, it should be appreciated that these exemplary embodiments are not limited for use among these particular types of wireless communication systems, and according to further exemplary embodiments, the present invention can be applied also to other technical fields in which enabling full duplex with self-interference cancellation is to be implemented and optimized.

Thus, certain embodiments of the present invention relate to mobile wireless communication systems, such as LTE, LTE-Advanced and WCDMA. In more detail, certain embodiments of the present invention are related to the configuration of an LTE/WCDMA transceiver and components thereof such as integrated circuits and/or discrete elements for mobile device transceiver or base station transceiver.

However, as indicated above, the present invention is not limited thereto, but other embodiments of the present invention are related to general radio transceiver equipment.

Figure 1:
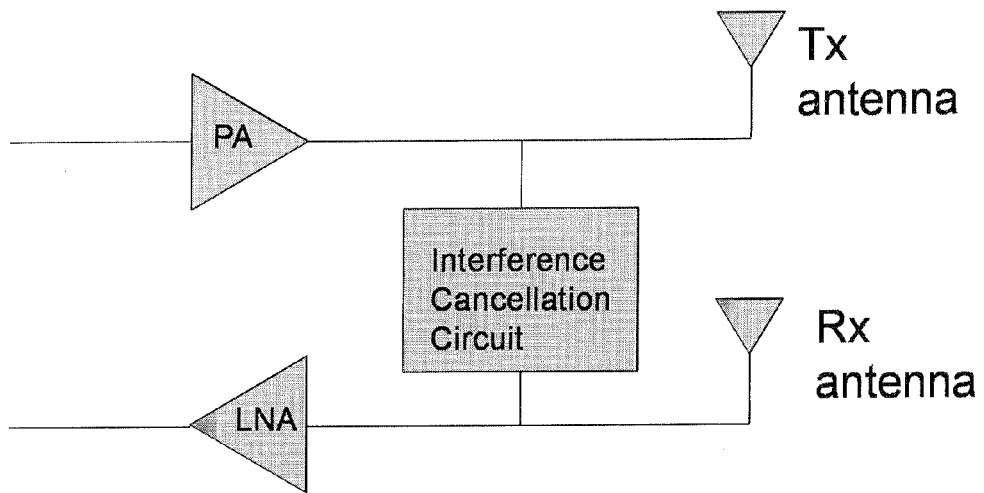
FIG. 1 shows a principle block diagram of an apparatus according to certain embodiments of the present invention.

An implementation example according to certain embodiments of the present invention for a full-duplex transceiver is shown in FIG. 1. As depicted therein, the implementation example includes an apparatus, comprising receiving circuitry Rx forming a signal receiving path arranged for transferring communication signals received via air interface; transmitting circuitry Tx forming a signal transmission path arranged for transferring communication signals to be transmitted via air interface; and interference cancellation circuitry in operable connection between the signal receiving path and the signal transmission path, wherein the receiving circuitry Rx and the transmitting circuitry Tx are arranged to receive and transmit communication signals at the same time and at the same frequency, wherein the interference cancellation circuitry comprises resistance, inductance and capacitance arranged to constitute a center frequency of an isolation range between the signal receiving path Rx and the signal transmission path Tx which substantially falls into the center of a communication band for the signals received and/or to be transmitted via air interface.

The apparatus can be arranged for use in a wireless communication device.

Another implementation example includes an apparatus, comprising means for forming a signal receiving path arranged for transferring communication signals received via air interface; means for forming a signal transmission path arranged for transferring communication signals to be transmitted via air interface; and means for interference cancellation in operable connection between the signal receiving path and the signal transmission path, wherein the means for forming a signal receiving path and the means for forming a signal transmission path are arranged to receive and transmit communication signals at the same time and at the same frequency, wherein the means for interference cancellation comprise resistance, inductance and capacitance arranged to constitute a center frequency of an isolation range between the signal receiving path and the signal transmission path which substantially falls into the center of a communication band for the signals received and/or to be transmitted via air interface.

The apparatus can be arranged for use in a wireless communication device

According to another implementation example, as shown in FIG. 1, interference cancellation circuitry is connected right between the Tx antenna (after the power amplifier) and the Rx antenna (before the low-noise amplifier). The interference cancellation circuitry comprises a parallel RLC resonator. It is noted that according to certain embodiments of the present invention, the parallel RLC resonator is formed by real (i.e. not ideal) components so that e.g. under certain circumstances the resistance is not formed by a discrete element but rather as a part of real inductance and capacitance components. Thus, the parallel RLC resonator is realized in the equivalent circuit. Further, according to certain embodiments of the present invention, the Tx antenna and the Rx antenna illustrated in FIG. 1 can be formed by a same component, i.e. using one antenna only, or can be formed by separate components. Further, the interference cancellation circuitry is not limited to dipole antennas. Since the resonance frequency of the antenna(s) is set to the center of the communication band, at the resonance frequency the antennas radiate efficiently and the TX antenna/path couples more power to the RX antenna/path. For this reason, the center frequency of the isolation range formed by the interference cancellation circuitry is configured according to (i.e. to substantially match) the center frequency of the communication band which is close to the resonance frequency of the antennas.

According to certain embodiments of the present invention the above described implementation examples could be modified as follows.

The apparatus further comprises an antenna, wherein said same antenna is arranged for both receiving communication signals via air interface and transmitting communication signals via air interface, wherein the interference cancellation circuitry comprises two inductance elements in an inductance branch, and wherein the antenna is connected between the two inductance elements in the inductance branch.

The interference cancellation circuitry further comprises a parallel branch having a capacitance element, and a parallel branch having a resistance element.

The apparatus further comprises a transmission path capacitance element in serial connection to the interference cancellation circuitry on a signal transmission path side; and a receiving path capacitance element in serial connection to the interference cancellation circuitry on a signal receiving path side.

The apparatus further comprises a receiving antenna in operable connection to the signal receiving path and arranged for receiving communication signals via air interface; and a transmission antenna in operable connection to the signal transmission path and arranged for transmitting communication signals via air interface.

The interference cancellation circuitry comprises a first interference cancellation stage which comprises either one of a first circuit design and a second circuit design, wherein the first circuit design comprises a first parallel branch having an inductance element and a second parallel branch having a capacitance element, and the second circuit design comprises a first parallel branch having an inductance element, a second parallel branch having a capacitance element, and a third parallel branch having a resistance element.

The interference cancellation circuitry additionally comprises a second and a third interference cancellation stage both of the second circuit design and arranged in serial connection with the first interference cancellation stage placed in the middle, wherein resonance frequencies of the stages are different from each other.

The interference cancellation circuitry additionally comprises a second to fifth interference cancellation stage each of the second circuit design and arranged in serial connection with the first interference cancellation stage placed in the middle, wherein resonance frequencies of the stages are different from each other.

The apparatus further comprises a power amplifier in the signal transmission path and a low noise amplifier in the signal receiving path, wherein the interference cancellation circuitry is connected at the antenna-side between the signal transmission path and the signal receiving path with respect to both the power amplifier and the low noise amplifier.

The interference cancellation circuitry consists of fixed elements.

The interference cancellation circuitry is formed by a fully passive network.

The apparatus further comprises wired interface circuitry.

The apparatus further comprises user interface circuitry; and user interface software arranged to enable user control through use of a human-machine-interface such as a display.

A specific implementation example of the apparatus according to certain embodiments of the present invention includes that a mobile phone comprises any of the above described apparatuses.

A further specific implementation example of the apparatus according to certain embodiments of the present invention includes that a base station comprises any of the above described apparatuses.

Figure 2:
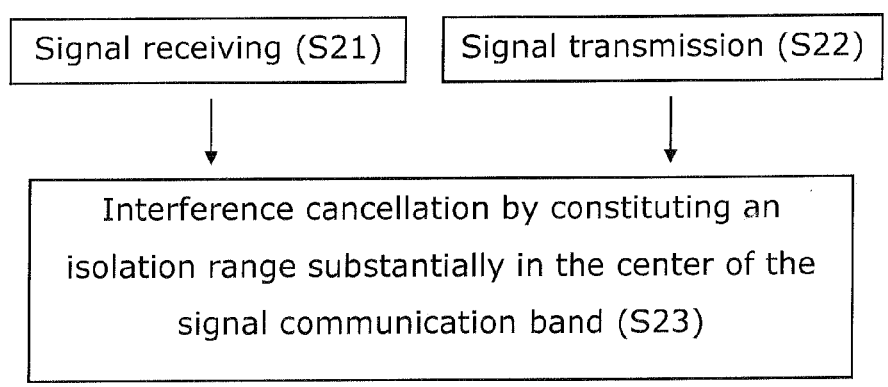
FIG. 2 shows a flow chart of a method according to certain embodiments of the present invention.

FIG. 2 shows a principle flowchart of an example for a method according to certain embodiments of the present invention. That is, as shown in FIG. 2, this method comprises receiving communication signals S21 via air interface and transferring the same in a signal receiving path; transmitting communication signals S22 via air interface and transferring the same in a signal transmission path, wherein the communication signals are received and transmitted at the same time and at the same frequency; and cancelling interference S23 between the signal receiving path and the signal transmission path by an interference cancellation circuitry connected there between, which comprises resistance, inductance and capacitance arranged to constitute a center frequency of an isolation range between the signal receiving path and the signal transmission path which substantially falls into the center of a communication band for the signals received and/or transmitted via air interface.

According to certain embodiments of the present invention the above described example method could be modified as follows.

The method further comprises connecting two inductance elements in an inductance branch of the interference cancellation circuitry, connecting an antenna between the two inductance elements in the inductance branch, and using said same antenna for both receiving communication signals via air interface and transmitting communication signals via air interface.

The method further comprises forming a parallel branch having a capacitance element and a parallel branch having a resistance element in the interference cancellation circuitry.

The method further comprises serially connecting a transmission path capacitance element to the interference cancellation circuitry on a signal transmission path side; and serially connecting a receiving path capacitance element to the interference cancellation circuitry on a signal receiving path side.

The method further comprises connecting a receiving antenna to the signal receiving path and using the same for receiving communication signals via air interface; and connecting a transmission antenna to the signal transmission path and using the same for transmitting communication signals via air interface.

The method further comprises forming the interference cancellation circuitry as a first interference cancellation stage with either one of a first circuit design and a second circuit design, wherein the first circuit design comprises a first parallel branch having an inductance element and a second parallel branch having a capacitance element, and the second circuit design comprises a first parallel branch having an inductance element, a second parallel branch having a capacitance element, and a third parallel branch having a resistance element.

The method further comprises additionally forming a second and a third interference cancellation stage both of the second circuit design and serially connecting the second and third interference cancellation stage with the first interference cancellation stage placed in the middle, wherein resonance frequencies of the stages are different from each other.

The method further comprises additionally forming a second to fifth interference cancellation stage each of the second circuit design and serially connecting the second to fifth interference cancellation stage with the first interference cancellation stage placed in the middle, wherein resonance frequencies of the stages are different from each other.

The method further comprises connecting a power amplifier in the signal transmission path and a low noise amplifier in the signal receiving path, wherein the interference cancellation circuitry is connected at the antenna-side between the signal transmission path and the signal receiving path with respect to both the power amplifier and the low noise amplifier.

The interference cancellation circuitry consists of fixed elements.

The interference cancellation circuitry is formed by a fully passive network.

One option for performing the example of a method according to certain embodiments of the present invention is to use the apparatus described in connection with FIG. 1 or a modification thereof which becomes apparent from the embodiments as described herein below.

Certain embodiments of the present invention are described herein below in further detail. Reference is made to implementation examples which depict certain embodiments of the present invention. It is to be noted though, that the implementation examples are provided for illustrative purposes only and are not intended to be understood as limiting the invention thereto. Rather, it is to be understood that the features of the implementation examples may be interchanged and mixed as will be understood from the whole of the present specification.

Certain embodiments of the present invention are formed by applying the above described apparatus and/or selected ones of its optional modifications to a full-duplex transceiver so that a compensation network is used between the transmitter and the receiver to achieve high isolation. Thus, an isolation range with a fixed center frequency and a fixed bandwidth can be accomplished by a fully passive network without tuning.

Specifically, according to certain implementation examples forming embodiments of the present invention it is possible to achieve more than 50 dB isolation over a 20 MHz and 80 MHz bandwidth for the single- and two-antenna systems, respectively. In addition, a simulated insertion loss of 3.5 dB caused by the passive elements inserted into the antenna-receiver and antenna-transmitter paths, respectively, is observed.

Figure 3:
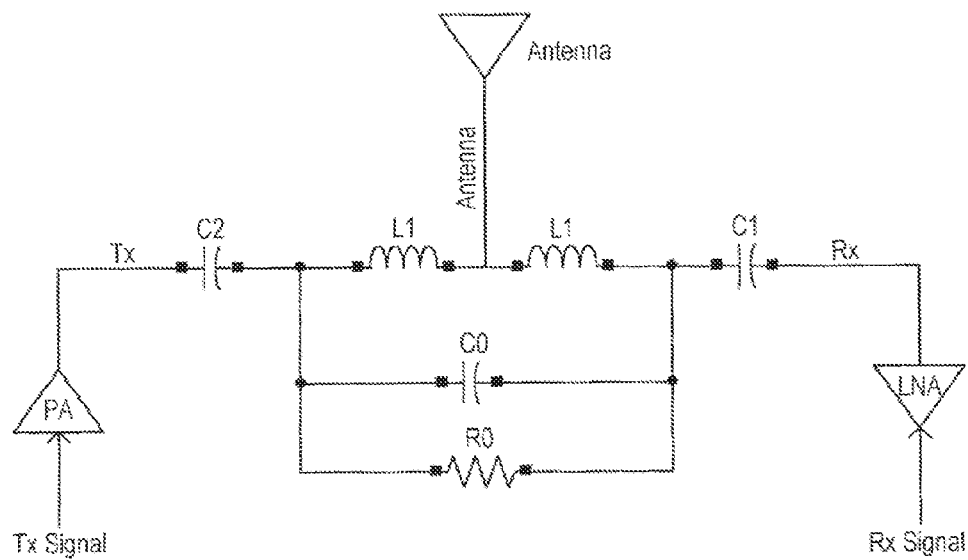
FIG. 3 shows an equivalent circuit illustrating a one-antenna system according to certain embodiments of the present invention.

According to certain embodiments of the present invention, in a single-antenna system the same antenna is used for both transmission (Tx) and receiving (Rx). In an example circuit, an implementation embodiment is formed by using two inductors which resonate with three capacitors to cancel out the current at the Tx or Rx. FIG. 3 shows an implementation example of the one-antenna system using real components from a 130 nm CMOS technology.

The capacitors C1 and C2 shown in FIG. 3 represent optional features according to certain embodiments of the present invention which are used to provide a wide bandwidth matching such as e.g. to 50Ω ports (receiver and transmitter) in an example implementation technology. They also separate the DC bias of the receiver from the transmitter, which is a desirable factor. That is, in the present one-antenna case, the additional capacitors contribute to broadband matching by providing more freedom of tuning and the isolation bandwidth is improved by adding the capacitors. They are however not mandatory in narrow-band applications.

Figure 4:
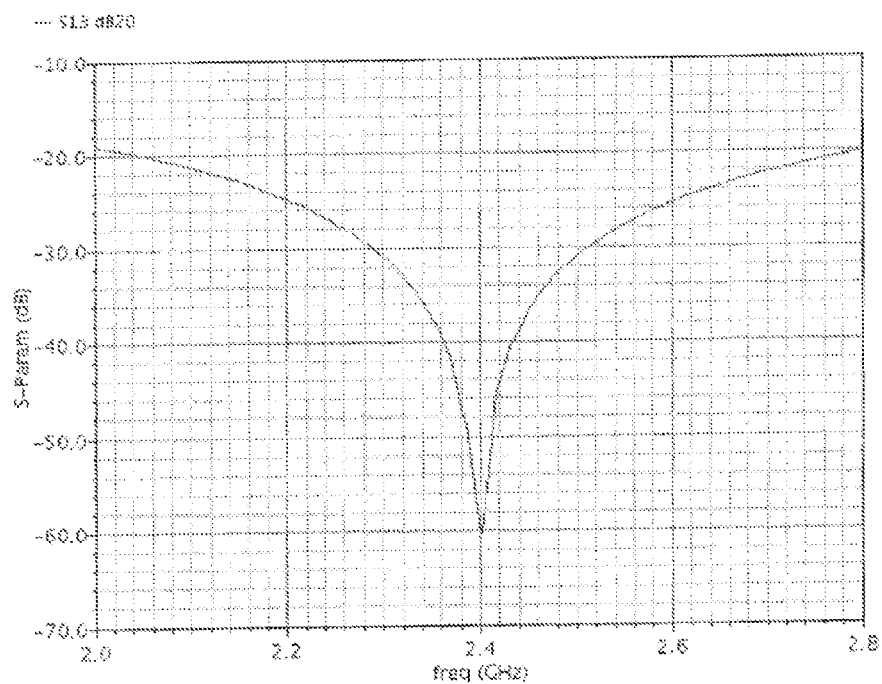
FIG. 4 shows a graph illustrating isolation for the one-antenna system according to certain embodiments of the present invention.

For simulation purposes, electronic design automation software such as ADS (Advanced Design System, provided by Agilent) can be used to optimize for the isolation and the bandwidth, and e.g. an isolation of 50 dB over a 20 MHz band can be achieved. With respect to the implementation example shown in FIG. 3 the simulated isolation is shown in FIG. 4.

According to further certain embodiments of the present invention, in a two-antenna system separate antennas are used for the transmitter (Tx) and the receiver (Rx). FIG. 5 illustrates a power coupling simulation model for the two-antenna system of a mobile device with base station. For designing an interference cancellation circuitry to provide high isolation between Tx antenna and Rx antenna, power coupling between the two antennas can be calculated from the simulation. In addition, the base station antenna can be added to the simulation to measure the effect of the cancellation circuit on the path loss. In this case, the interference from Tx to Rx, the power loss from base station to Rx and from Tx to BS are taken into account.

In an example simulation, half-wavelength dipole antennas which resonate at 3.5 GHz are used. The distance between the Tx and Rx antennas is set to 25 mm and the BS antenna is considered placed far away to model the far field effect between the BS and the mobile device.

For comparison, FIG. 6 shows a graph illustrating the simulation result for the antenna model without an interference cancellation circuitry.

In the simulation, S parameter results are used to represent the power coupling between the antennas. Port 1 stands for Tx antenna, port 2 stands for Rx antenna, and port 3 for BS antenna. So the absolute value of S21 is the Tx to Rx isolation, and S31 and S23 are the Tx to BS and BS to Rx transmissions, respectively.

Reference is made again to FIG. 1 showing a simple model of the two-antenna system (when the depicted Tx antenna and Rx antenna are conceived as separate components) e.g. for a cell phone. The interference cancellation circuitry is connected right between the Tx antenna (after PA) and Rx antenna (before LNA). Ideally, if the power coupled from the Tx antenna to Rx antenna and the power transmitted through the cancellation circuitry have the same magnitude but opposite phase, then the interference is zero and the isolation is infinite in dB.

Based on the simulation result of the power coupling behavior between the Tx and Rx antennas, it is understood that coupling is very strong at the resonant frequency of the antennas. Thus, a related parallel RLC resonator is employed.

Figure 7:
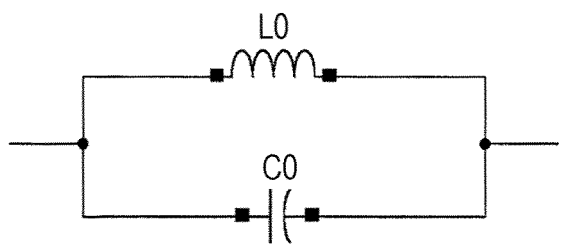
FIG. 7 shows a single stage circuit according to certain embodiments of the present invention.

According to certain embodiments of the present invention a single stage circuit is used for the interference cancellation circuitry. FIG. 7 shows an implementation example for such a single stage circuit depicting an inductance branch and a capacitance branch for the RLC resonator which are formed by real components. For example, in the present two-antenna case only LC in single stage can be used by optimizing the isolation in the technology used (130 nm CMOS). Though, in other technologies a resistor might be needed.

Figure 8:
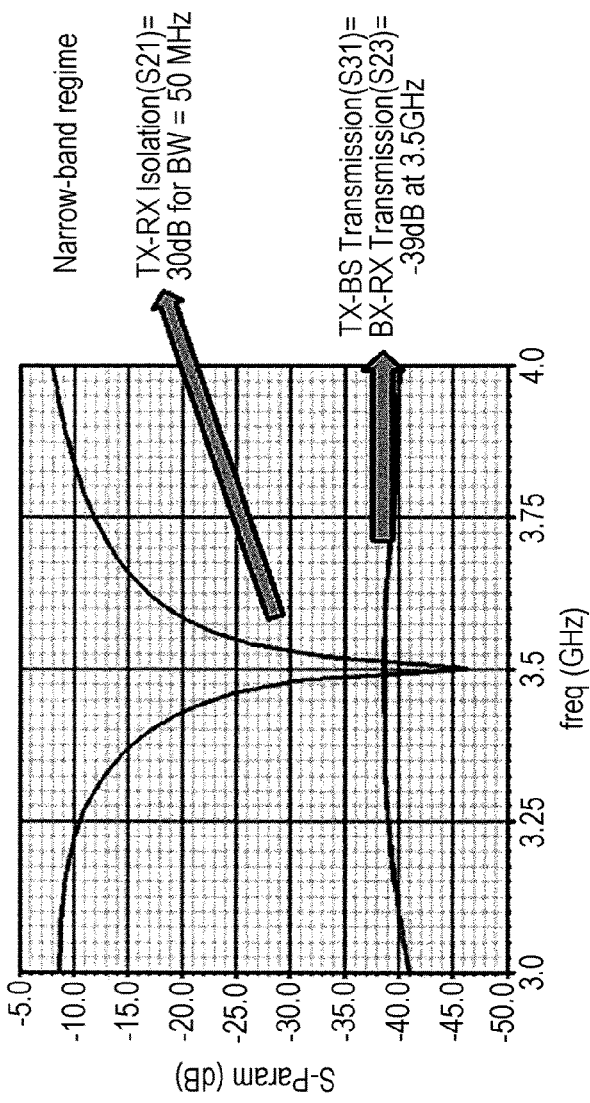
FIG. 8 shows graph illustrating a simulation result for the single stage system.

FIG. 8 shows a graph illustrating a simulation result for the single stage system. Specifically, by connecting the single stage circuit to the antenna system, the performance of the single stage system can be simulated. The isolation can be as large as 45 dB and it has 50 MHz bandwidth for 30 dB level. The loss can be calculated by taking the differential value of the transmission values with and without this circuit. In this case, the loss is less than 1 dB.

Figure 9:
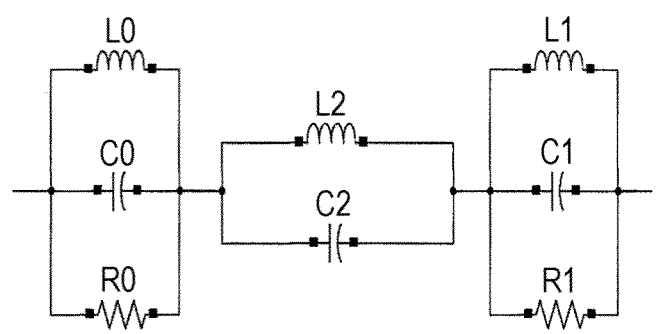
FIG. 9 shows a three stage circuit according to certain embodiments of the present invention.

According to further certain embodiments of the present invention a three stage circuit is used for the interference cancellation circuitry. FIG. 9 shows an implementation example for a three stage circuit, where two more parallel RLC stages are added to broaden the bandwidth, by setting the parallel RLC resonators in series and to different resonant frequencies.

Figure 10:
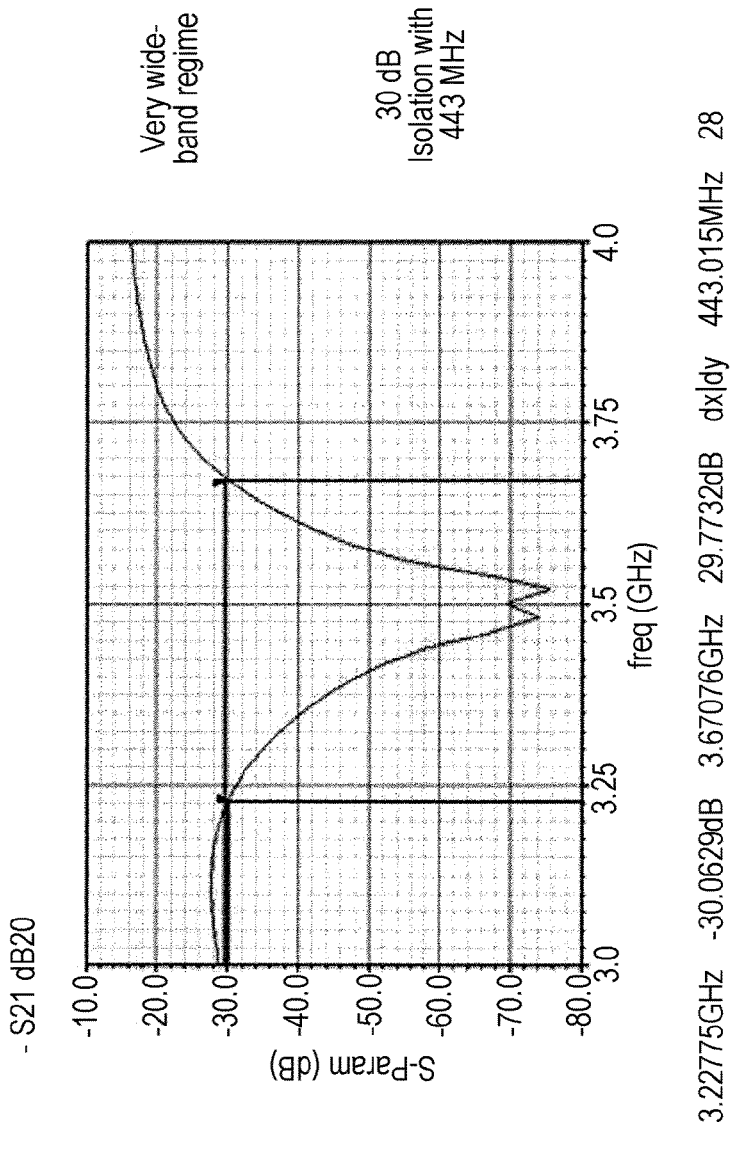
FIG. 10 shows a graph illustrating the isolation for the two-antenna system with a three stage circuit according to certain embodiments of the present invention.

FIG. 10 shows a graph illustrating isolation for the two-antenna system with a three stage circuit using real components from a 130 nm CMOS technology.

Figure 11:
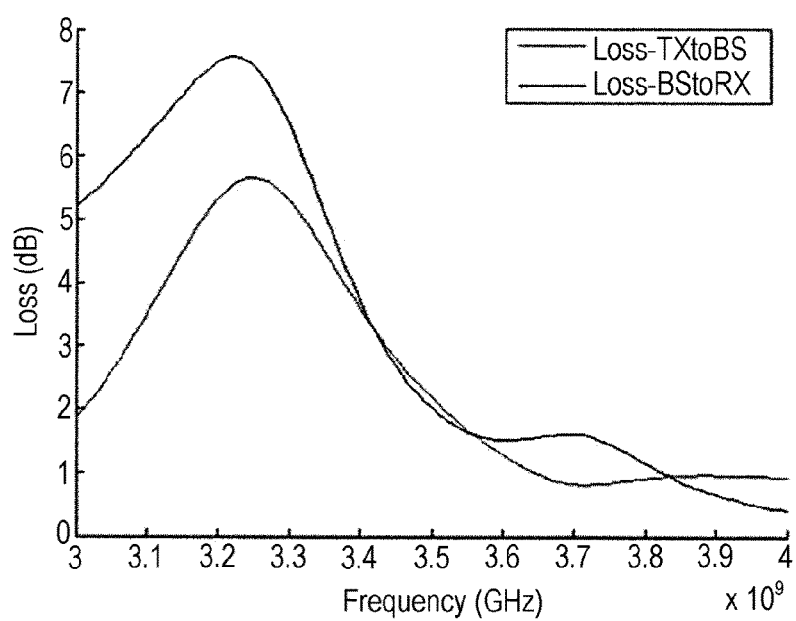
FIG. 11 shows a graph illustrating loss for the two-antenna system with a three stage circuit according to certain embodiments of the present invention.

FIG. 11 shows a graph illustrating the loss for the two-antenna system with three stage circuit using real components from a 130 nm CMOS technology.

Thus, it is demonstrated that in an optimized version for a three stage system, an isolation as large as 70 dB can be achieved, a bandwidth of 443 MHz for 30 dB isolation and 175 MHz for 50 dB isolation can be accomplished, and the loss can be maintained at roughly 1.5 dB at the center frequency 3.5 GHz.

Figure 12:
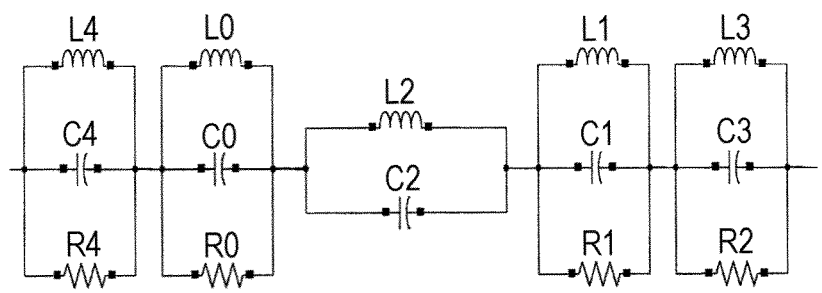
FIG. 12 shows a five stage circuit according to certain embodiments of the present invention.

According to still further certain embodiments of the present invention even more stages can be added in series to achieve wider bandwidth (and by thus realizing different resonance frequencies) such as a five stage circuit shown in FIG. 12. Though, process variation and mismatch during circuit manufacture should also be considered. Since more components are likely to cause more component values to vary, the effective yield of the manufacture will be lower. Thus, using more stages is possible and within the scope of certain embodiments of the present invention but subject to a trade-off.

As described above, certain embodiments of the present invention achieve the advantages of power efficiency, simplicity, and linearity of the passive network constituting the interference cancellation circuitry, where only passive components are used to minimize distortion at very high power levels. Further, the channel capacity of a communication band is increased without requiring more bandwidth. Hence, certain embodiments of the present invention can favorably be used to construct transceivers and antennas for mobile devices and base stations.

As indicated above, certain embodiments of the present invention include radio-frequency cellular chipset(s) and equipment such as according to LTE/LTE-Advanced and/or WDCMA, but are not limited thereto.

According to the above description, it is thus apparent that exemplary embodiments of the present invention provide, for example from the perspective of a mobile phone transceiver or a base station transceiver or a component thereof, an apparatus embodying the same, a method for controlling and/or operating the same, and computer program(s) controlling and/or operating the same as well as mediums carrying such computer program(s) and forming computer program product(s).

For example, described above are apparatuses, methods and computer program products enabling a full duplex system with self-interference cancellation.

Implementations of any of the above described blocks, apparatuses, systems, techniques or methods include, as non limiting examples, implementations as hardware, software, for example in connection with a digital signal processor, an instruction set, firmware, special purpose circuits or application logic, general purpose hardware or controller or other computing devices, or some combination thereof. Software or application logic or an instruction set may be maintained on any one of various conventionally available computer-readable media (which shall be understood as anything which can contain, store, communicate, propagate or transport instructions in connection with an instruction execution system). Further, it is to be understood that where reference is made to a processor, such processor is to be understood in its broadest sense and may, for example, additionally comprise or not comprise a memory (e.g., ROM, CD-ROM, etc.), and it may comprise a computer processor (including dual-core and multiple-core processors), an application-specific integrated circuit (ASIC), a field-programmable gate array (FPGA), and/or other hardware components that have been programmed in such a way to carry out the described function.

Further, as used in this application, the term circuitry refers to all of the following: (a) hardware-only circuit implementation (such as implementations in only analog and/or digital circuitry) and (b) to combinations of circuits and software (and/or firmware), such as (as applicable): (i) to a combination of processor(s) or (ii) to portions of processor(s)/software (including digital signal processors(s)), software and memory(ies) that work together to cause an apparatus, such as a mobile phone or server, to perform various functions, and (c) to circuits, such as microprocessors(s), that require software or firmware for operation, even if the software or firmware is not physically present.

This definition of circuitry applies to all uses of this term in this specification including in any claims. As a further example, as used in this specification, the term circuitry would also cover an implementation of merely a processor (or multiple processors) or portion of a processor and its (or their) accompanying software and/or firmware. The term circuitry would also cover, for example and if applicable to the particular claim element, a baseband integrated circuit or applications processor integrated circuit for a mobile phone and/or base station or a similar integrated circuit in server, a cellular network device, or other network device.

If desired, the different functions discussed herein may be performed in a different order and/or concurrently with each other. Furthermore, if desired, one or more of the above described functions may be optional or may be combined.

Although various aspects of the invention are set out in the appended independent claims, other aspects of the invention comprise other combinations of features from the described embodiments and/or the dependent claims with the features of the independent claims, and not solely the combinations explicitly set out in the claims.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising:
   receiving circuitry configured to form a signal receiving path arranged for transferring communication signals received via air interface;
   transmitting circuitry configured to form a signal transmission path arranged for transferring communication signals to be transmitted via air interface; and
   interference cancellation circuitry in operable connection between the signal receiving path and the signal transmission path,
   wherein the receiving circuitry and the transmitting circuitry are configured to receive and transmit communication signals at the same time and at the same frequency,
   wherein the interference cancellation circuitry is configured to provide an isolation range between the signal receiving path and the signal transmission path that includes the center of a communication band for the signals received and/or to be transmitted via air interface, the interference cancellation circuitry comprising a first interference cancellation stage which comprises a first circuit design or a second circuit design, wherein the first circuit design comprises a first parallel branch having an inductance element and a second parallel branch having a capacitance element, and the second circuit design comprises a first parallel branch having an inductance element, a second parallel branch having a capacitance element, and a third parallel branch having a resistance element, the interference cancellation circuitry additionally comprising a second interference cancellation stage and a third interference cancellation stage both comprising the second circuit design that is arranged in serial connection with the first interference cancellation stage.

2. The apparatus according to claim 1, further comprising:
   an antenna, wherein said same antenna is configured for both receiving communication signals via air interface and transmitting communication signals via air interface,
   wherein the interference cancellation circuitry comprises two inductance elements in an inductance branch, and
   wherein the antenna is connected between the two inductance elements in the inductance branch.

3. The apparatus according to claim 2, wherein the interference cancellation circuitry further comprises a parallel branch having a capacitance element, and a parallel branch having a resistance element.

4. The apparatus according to claim 1, further comprising:
   a receiving antenna in operable connection to the signal receiving path and configured for receiving communication signals via air interface; and
   a transmission antenna in operable connection to the signal transmission path and configured for transmitting communication signals via air interface.

5. The apparatus according to claim 1, further comprising:
   a power amplifier in the signal transmission path and a low noise amplifier in the signal receiving path, wherein the interference cancellation circuitry is connected at the antenna-side between the signal transmission path and the signal receiving path with respect to both the power amplifier and the low noise amplifier.

6. The apparatus according to claim 1, wherein the interference cancellation circuitry consists of fixed elements.

7. The apparatus according to claim 1, wherein the interference cancellation circuitry is formed by a fully passive network.

8. The apparatus according to claim 1, further comprising wired interface circuitry.

9. The apparatus according to claim 1, further comprising:
user interface circuitry; and
user interface software arranged to enable user control through use of a human-machine-interface such as a display.

10. The apparatus according to claim 1, wherein the first interference cancellation stage is placed between the second interference cancellation stage and the third interference cancellation stage.

11. The apparatus according to claim 1, wherein resonance frequencies of the first, second and third interference cancellation stages are different from each other.

12. A method, comprising:
receiving communication signals by a receiving circuitry via air interface and transferring the same in a signal receiving path;
transmitting communication signals by a transmitting circuitry via air interface and transferring the same in a signal transmission path,
wherein the communication signals are received and transmitted at the same time and at the same frequency; and
cancelling interference between the signal receiving path and the signal transmission path by interference cancellation circuitry connected there between, which is configured to provide an isolation range between the signal receiving path and the signal transmission path that includes the center of a communication band for the signals received and/or transmitted via air interface, the interference cancellation circuitry comprising a first interference cancellation stage which comprises a first circuit design or a second circuit design, wherein the first circuit design comprises a first parallel branch having an inductance element and a second parallel branch having a capacitance element, and the second circuit design comprises a first parallel branch having an inductance element, a second parallel branch having a capacitance element, and a third parallel branch having a resistance element, the interference cancellation circuitry additionally comprising a second interference cancellation stage and a third interference cancellation stage both comprising the second circuit design that is arranged in serial connection with the first interference cancellation stage.

13. The method according to claim 12, further comprising:
connecting two inductance elements in an inductance branch of the interference cancellation circuitry,
connecting an antenna between the two inductance elements in the inductance branch, and
using said same antenna for both receiving communication signals via air interface and transmitting communication signals via air interface.

14. The method according to claim 12, further comprising:
forming a parallel branch having a capacitance element and a parallel branch having a resistance element in the interference cancellation circuitry.

15. The method according to claim 12, further comprising:
connecting a receiving antenna to the signal receiving path and using the same for receiving communication signals via air interface; and
connecting a transmission antenna to the signal transmission path and using the same for transmitting communication signals via air interface.

16. The method according to claim 12, further comprising:
connecting a power amplifier in the signal transmission path and a low noise amplifier in the signal receiving path, wherein the interference cancellation circuitry is connected at the antenna-side between the signal transmission path and the signal receiving path with respect to both the power amplifier and the low noise amplifier.

17. The method according to claim 12, wherein the interference cancellation circuitry consists of fixed elements.

18. The method according to claim 12, wherein the interference cancellation circuitry is formed by a fully passive network.

19. The method according to claim 12, wherein the first interference cancellation stage is placed between the second interference cancellation stage and the third interference cancellation stage.

20. The apparatus according to claim 12, wherein resonance frequencies of the first, second and third interference cancellation stages are different from each other.

* * * * *